United States Patent
Koch et al.

(10) Patent No.: US 8,627,393 B1
(45) Date of Patent: Jan. 7, 2014

(54) SYSTEM AND METHOD FOR COMMUNICATING STORED POWER MEASUREMENT PARAMETERS BETWEEN DEVICES IN A COMMUNICATION SYSTEM

(75) Inventors: Barry Koch, Ingolstadt (DE); Thomas Widmer, Southlake, TX (US); Manfred Reiss, Ingolstadt (DE)

(73) Assignee: CSR Technology Inc., San Jose, CA (US)

( * ) Notice: Subject to any disclaimer, the term of this patent is extended or adjusted under 35 U.S.C. 154(b) by 1154 days.

(21) Appl. No.: 12/024,740

(22) Filed: Feb. 1, 2008

Related U.S. Application Data (62) Division of application No. 09/949,008, filed on Sep. 7, 2001, now Pat. No. 7,369,827.

(51) Int. Cl.
*H04N 7/173* (2011.01)

(52) U.S. Cl.
USPC .......... 725/111; 725/107; 725/109; 725/110; 455/301

(58) Field of Classification Search
USPC ........ 725/107–111; 455/226.1, 301; 348/180, 348/607
See application file for complete search history.

(56) References Cited

U.S. PATENT DOCUMENTS

| | | | |
|---|---|---|---|
| 5,657,078 A * | 8/1997 | Saito et al. | 348/180 |
| 5,994,955 A | 11/1999 | Birkeland | |
| 6,131,023 A * | 10/2000 | Matsuura | 455/301 |
| 6,169,569 B1 * | 1/2001 | Widmer et al. | 725/111 |
| 7,089,580 B1 * | 8/2006 | Vogel et al. | 725/111 |
| 7,469,414 B1 * | 12/2008 | Roeck et al. | 725/111 |
| 2003/0043300 A1 * | 3/2003 | White | 348/607 |

OTHER PUBLICATIONS

McGinn, Mike, "An Advanced I.F. Amplifier & AFT System Suitable for HDTV," IEEE Transactions on Consumer Electronics, vol. 36 No. 3, Aug. 1990, pp. 407-414.
Pratt, William J., "High Linearity HBT Amplifier Targets Multicarrier Systems" RF Design, Mar. 1996, pp. 47-54.
Kokozinski, Rainer, et al. "Microwave Wideband Amplifiers in Bulk-CMOS/SIMOX Technologies," IEEE International Solid-State Circuits Conference, 1995, pp. 146-147, 188-189.

* cited by examiner

*Primary Examiner* — Brian Pendleton
*Assistant Examiner* — Alan Luong
(74) *Attorney, Agent, or Firm* — Fulbright & Jaworski LLP (57) ABSTRACT

During tuner manufacture, the unique power parameters as a function of frequency and channel are stored on a memory unique to each tuner. When the tuner is subsequently incorporated into another device, such as a modem, the stored power parameters are made available to the subsequent device, thereby overriding the need for subsequent calibration tests to be run. The stored parameters aid in remote testing of the communication device and also allow for individual channel by channel setting of TOP levels.

16 Claims, 3 Drawing Sheets

SYSTEM AND METHOD FOR COMMUNICATING STORED POWER MEASUREMENT PARAMETERS BETWEEN DEVICES IN A COMMUNICATION SYSTEM

CROSS-REFERENCE TO RELATED APPLICATIONS

The present application is a divisional of, commonly assigned, U.S. patent application Ser. No. 09/949,008 entitled "SYSTEM AND METHOD FOR COMMUNICATING STORED POWER MEASUREMENT PARAMETERS BETWEEN DEVICES IN A COMMUNICATIONS SYSTEM," filed Sep. 7, 2001, the disclosure of which is hereby incorporated herein by reference.

TECHNICAL FIELD

This invention relates to tuners and more particularly to tuners where the unique power levels for each tuner is derived during manufacture of the tuner and stored on the tuner for use by devices which incorporate the tuner.

BACKGROUND OF THE INVENTION

A tuner is a frequency translation device which translates incoming RF signals from one frequency to a typically lower frequency. The information content of the received RE signal is normally modulated is some fashion on a carrier wave and the tuner serves to de-modulate the RE carrier in order to extract the original data stream. Tuners are used in practically every wireless transmitting/receiving device, particularly in the consumer product market.

For example, TV tuners are found in set top boxes, televisions, VCRs, as well as cable modems and other wide bandwidth access devices. These tuners take in a particular high frequency signal, translate and filter the signal, to a lower frequency signal, which is typically a fixed frequency for a particular application. The output of the tuner at the second frequency (called an intermediate frequency) is then available for further processing.

For most consumer applications, the price of the tuner is one of the driving motivations. The price drives the acceptance for use in the consumer market and tuner manufacturers must balance the price/performance model. With price in mind, there are many different topologies to achieve the functionality required by the tuner. Certain shortcuts or compromises must be made in terms of the hardware realization of the tuner in order to achieve competitive prices/performances.

In the field of cable modems, there are two basic broad categories of tuners in current use. One of those is what's commonly referred to as a double conversion tuner, which has two frequency translations. Between these two frequency translations that is a fixed, (typically higher) frequency where the filtering is achieved. The input of these devices is typically very wide band.

The other approach is what's commonly called a single conversion tuner. Single conversion tuners have tracking filters at the input that track the frequency of the signal, thereby reducing the total signal power on the input of the tuner. Single conversion tuners have one frequency translation direct from the incoming RF to a fixed frequency where filtering occurs. Traditionally, single conversion tuners are used in terrestrial devices, such as televisions. VCR receivers, etc. Through economies of scale due to the large number of these tuners, they tend to be the lower cost alternatives.

The single conversion tuner, however, because it does have tracking filters, requires a different architecture than does the double conversion tuner. One of these architectures is that the entire frequency band, which is very wide covering roughly from 50 to almost 900 megahertz, must be split into several bands in order to achieve the necessary tracking filter functionality. Since tuners are used as a "from end" to other devices it is important to calibrate the gain of the tuner to subsequent circuitry for proper performance. Thus, it is necessary to know the "typical" gain for a tuner to achieve proper overall system operation.

One drawback of single conversion tuners is that the gain of the tuner, that is the gain from the input signal to the output signal of the tuner as a whole, varies significantly over frequency, temperature and other aspects. The gain varies not only within the tuner across frequencies, (mainly because different circuits handle different bands) but also the characteristic and absolute gain of a particular frequency varies from tuner to tuner. Current tuners are typically set to provide a gain variation across all receive frequencies of a maximum of 8 db. As discussed, this presents a problem in that the gain is not repeatable from tuner to tuner nor within bands of the same tuner. Therefore, to extrapolate what a given gain will be at a given frequency of the tuner is difficult without actually measuring the gain of that device. Therefore, when tuners are selected at random and when a given frequency is selected it is difficult to know what the gain of that tuner will be, except that it will lie within the specified 8 db of gain range.

Due to the switching between bands of a tuner, there is discontinuity in gain between the higher end of one band and the lower end of the next band. One method of working around this problem is to have the demodulator which follows the tuner device extract the digital information from the frequency translated signal by a closed loop system. This means that although the absolute gain of the tuner over frequency may vary up to 8 db, the closed loop function of the demodulator will control the system such that as far as the demodulator input sees, the power is constant. These applications are acceptable for approximately 95% of current users.

The new DOCSIS Specification (DOCSIS1.1) has a number of modifications, many of which deal with software modifications that are irrelevant to the tuner functionality. However, there is one addition or modification to this specification which does have significant impact on the tuner, and that is a requirement allowing cable companies or others, to communicate with the modem end user device and poll this device to determine the incoming signal level to that modem. This power measurement capability will allow the cable company to troubleshoot their network since they could, in theory, find the power level at each end user on their cable plant, and in such a fashion, determine information regarding the quality of their signal, as well as any problems or interruptions in that signal.

Specifications for this ability to measure the power are in terms of an absolute gain variation. In other words, it is desired to determine the input power level within the variation of, for example, plus or minus 2 db. In addition, it is desired to be able to step change the power levels to within a certain specified resolution. For example, for a step increase of 1 db of power, the end user device should be able to report a modification in gain of 1 db plus or minus ½ db. These requirements are contrary to the gain variation of current tuners, since, as discussed above, tuners typically have a gain variation of 8 db.

In order to achieve accurate downstream power measurement the cable operator must perform (or have performed by the modem vendor) a very detailed, multi-point power calibration for each tuner/demodulator combination. Because of the fact that the measurement of power from the operator can be performed at any time and at any input power frequency, the closed loop gain variation controlled by the demodulator and which controls the gain of the tuner may be at any arbitrary setting. This requires that the end unit cable modem. be able to report the input power level within the specified accuracy regardless of the input power, as long as that is within the specified range.

Due to the gain variations across frequency, and also the non-linear behavior of the gain control AGC function, it is necessary to derive a matrix of data gain versus frequency and gain versus AGC control voltage, and store this in non-volatile memory existing within the end user's device. Currently, the end user measures the input power through reading of a register within the demodulator that is mounted on their cable modem. One drawback of this approach is that the reading of this downstream power measurement is very slow—the order of three minutes per device. Each device must be separately calibrated and the data stored therein. Once the data is stored, a simple table lookup procedure based upon frequency can be used to provide correction for power measurement determinations.

In typical RF receivers, there are two variable gain stages. The first is the RF amplifier, sometimes referred to as a Low Noise Amplifier, and the second is the IF (intermediate frequency) amplifier. To maximize the signal-to-noise-ratio (SNR), it is desirable for the RF amplifier to operate at maximum gain. However, if the input signal becomes large, it may overload the circuits downstream of the RF amp. Thus, there is some input signal level where it becomes necessary to roll off the gain of the RF amp. This point is called the TOP. In general, engineers defining receiver AGC characteristics call for the RF amp to operate at full gain for weaker signals and account for increasing signal strength by first reducing the gain of the IF amp. Once the IF amp is operating at a minimum gain setting, then the gain of the RF amp is reduced. Because of the variation of gain versus frequency and AGC setting in the RF amp one TOP setting for all channels does not result in the best overall performance.

One solution is to reduce the necessity of performing multi-point calibration by reducing the amount of allowed gain variation across the frequency range in the tuner itself. However, due to the fact that single conversion tuners are typically manually adjusted through the alignment of coils within the tuner and the fact that multiple operators align tuners at a given time, and given the number of degrees of freedom available within a tuner in order to achieve correct tracking and alignment, it is not feasible within a high production environment to achieve the necessary tolerance.

BRIEF SUMMARY OF THE INVENTION

These problems, as well as other, have been solved by performing the calibration while the tuner is being built and then providing the calibration data to the customer (tuner user) for each tuner. The logistics of providing the data to the user can be significant in terms of the number of points of gain versus frequency is solved by loading the data on, for example an electrical programmable read only memory (EEPROM) device on the tuner. In this way, each tuner would have all of the information necessary to make the proper identification. Since the calibration information is generated on test machines specific to tuners, the data can be generated concurrently with the alignment testing, thereby achieving lower costs.

In essence, the invention uses a non-volatile memory on the tuner to record the tuner's gain versus frequency and AGC setting during final test. This information is then used by a cable modem manufacturer, or more generally a communications receiver manufacturer, to account for the substantial gain variations from tuner to tuner as well as the variations at different frequencies and AGC settings within a given tuner when computing received power. The only information available to the modem regarding received power is the gain settings of the tuner and IF stage, and so to compute the received power, the modem must have accurate information regarding the gain.

We have solved the TOP control problem by using the data pertaining to gain as a function of frequency which is stored on the tuner to also control the TOP setting on a channel by channel basis. Thus optimizing the signal to noise ratio (SNR) of TOP received signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
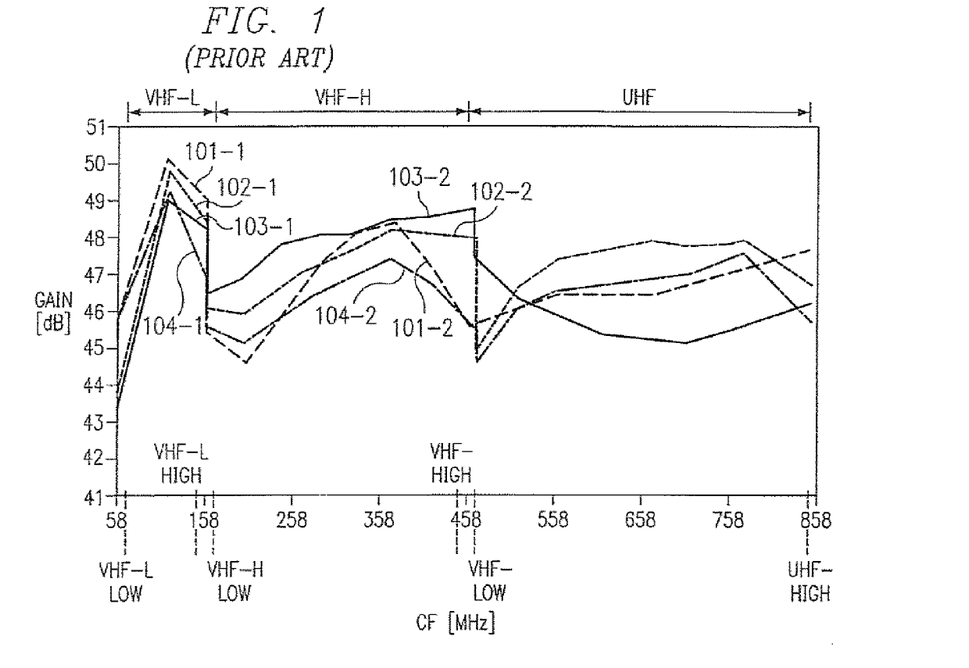
FIGS. 1 and 2 show prior art graphs of various tuners with respect to different frequencies.

FIG. 1 shows the problem that must be overcome with respect to the use of different tuners across four different bands. FIG. 1, shows the gain variation of a single conversion tuner currently being produced. The wide frequency range from 58 to 860 megahertz is shown broken into three sub bands VHF-L (45 MHz-162 MHz); VHF-H (163 MHz-468 MHz; and UHF (469 MHz-860 MHz). On the plot of FIG. 1 we have four different curves indicating the gain variation or the gain versus frequency of four different tuners in order to show the variation between tuners and the variation between bands. Within band 1, extending from 50 MHz to 158 MHz, we have four gain curves, 101-1, 102-1, 103-1 and 104-1. Each line shows a different tuner of a similar type showing the gain variation over frequency for that tuner.

Several facts can be seen from this plot. Within a given band, the shape of the gain variation may change dramatically. Also the gain for a particular tuner for a given frequency may be significantly different than other tuners at the same frequency. FIG. 1 highlights the problem of gain variation between single conversion tuners over frequency.

Also, note that in FIG. 1 the gain variation versus frequency is for one given gain setting of the tuner. Thus the AGC control function of the tuner is set at a constant level and the gain variation seen across frequency is due simply to the gain variation within the internal tracking filters and other internal circuitry of each tuner.

Figure 2:
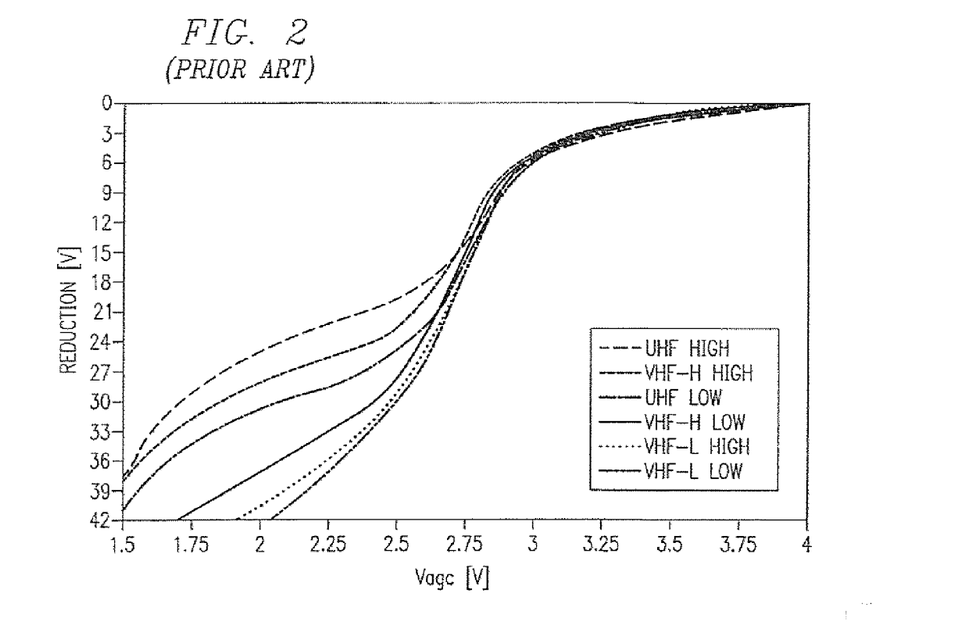

FIG. 2, shows gain variation in another dimension, namely at one particular frequency. The frequency is fixed and we are looking at the gain versus the AGC control voltage. This voltage, as it is reduced, causes the gain of the tuner to reduce as well. There are six different curves on this figure. These six curves are at different frequencies as shown on the legend and shows the variation of gain versus voltage versus frequency. From the plot in FIG. 2, several things can be seen. First of all, gain varies with voltage, as would be expected with an AGC function. But this variation is also very non-linear and is frequency dependent due to the gain variation characteristics of the components being used in the tuner. This non-linear behavior then requires a multi-point calibration to replicate this curve—simply using two or three point linear interpolations cannot achieve the required resolution.

Figure 4:
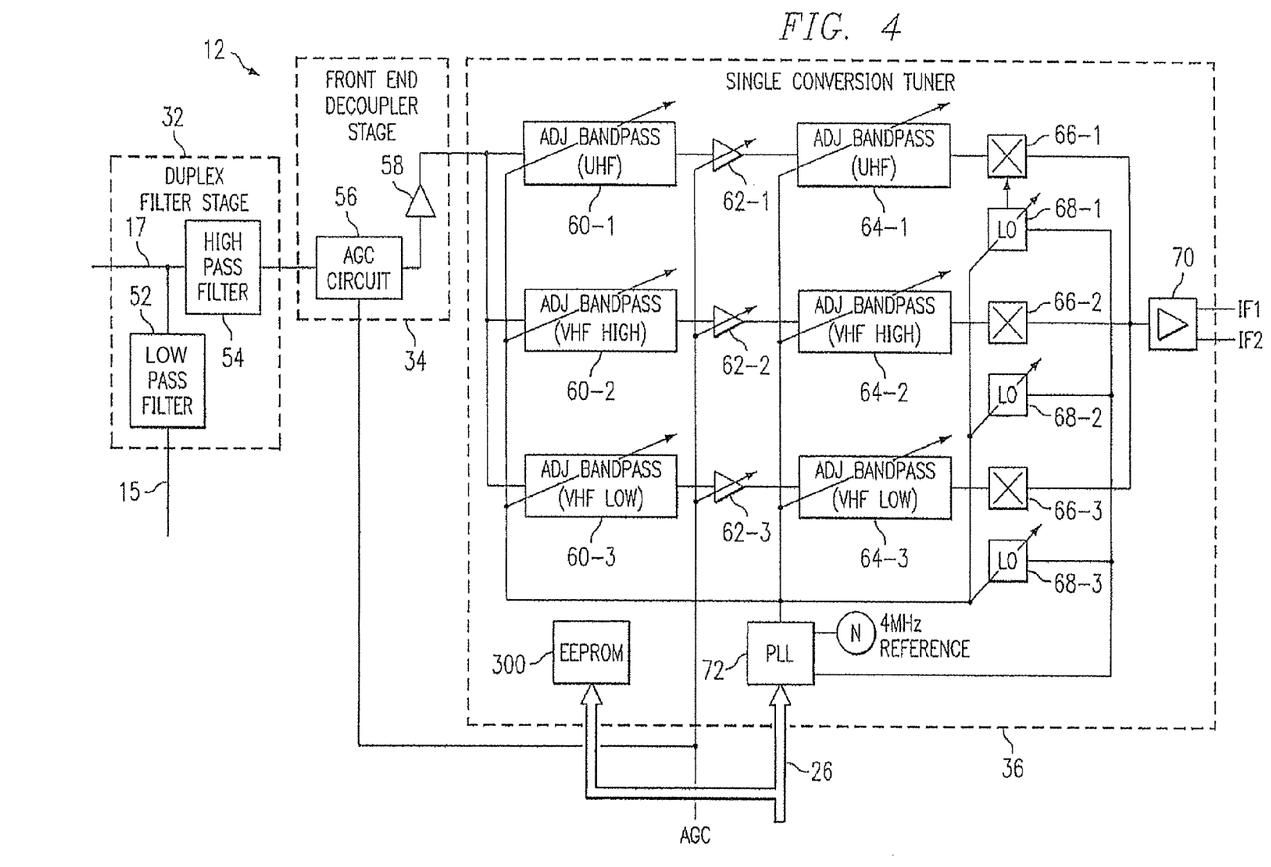
FIG. 4 shows one embodiment of a tuner.

FIG. 4 is a depiction of the invention showing the block structure of a single conversion tuner currently being used, plus the additional onboard memory device, in this embodiment, EEPROM 300, in which the calibration data which is obtained through the calibration process is stored. This information can later be accessed by the customer from within the end user device, such as a modem. EEPROM 300 is accessed through serial bus 26 which is also used to control the tuning function of the tuner via the PLL 72. This means that there are no additional inputs or access points to the tuner required in order to obtain this functionality, thereby also allowing a pin for pin compatibility with existing solutions.

Figure 3:
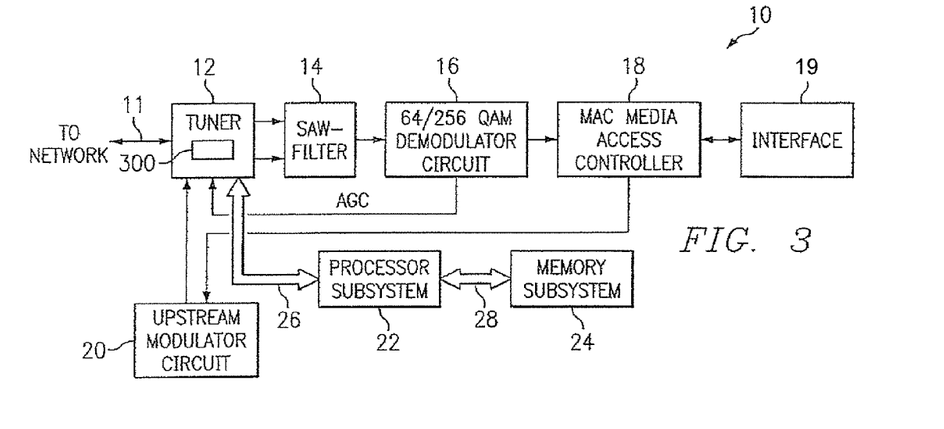
FIG. 3 shows a typical device into which a tuner can be incorporated.

FIG. 3 shows the block diagram of a complete cable modem access device, one part of which is tuners with memory device. Also shown is bus control 26 feature going from processor subsystem 22, to tuner 12. The processor software is written by the customer for the end user device to control the end user device, and also to provide for tuner functionality or programming of the tuner. In a similar way, the customer can provide additional software features, transmitted via the same bus to access the information stored on memory device 300. One can either access that information directly from the memory device for immediate processing, or download the complete information stored in that device to subsystem memory 24.

Continuing in FIG. 3, cable modem 10 which includes tuner 12 will now by described in greater detail. Cable modem 10 is coupled to a network (not shown) by cable 11, typically, a coaxial cable, which is connected to an input/output ("I/O") port (not shown in FIG. 3) of tuner 12. For example, the I/O port may be a conventional F-type RF connector adapted to receive a feed within the CATV-frequency band which as discussed above extends from a 54 MHz to 858 MHz. In addition to a traditional CATV system site which generates a CATV signal onto cable 11 for distribution to plural destinations, one of which is tuner 12, it is contemplated that various other systems for receiving or transmitting video, audio and/ or other types of data signals, may also reside on the network. The power measurement signal requests comes form the network and the response to such request is fed back over the network. Tuner 12 is a single conversion tuner, but could be any type of tuner.

The tuner 12 is bi-directional in that an incoming signal received from the network via the cable 11 is directed downstream to the computer system while an incoming signal received from the computer system is directed upstream to the network. In operation, an input signal to cable modem 10, for example, an RF signal, preferably a CATV signal which extends from 54 MHz to 858 MHz, generated by a device residing on the network, is received by tuner 12. Tuner 12 converts the RF signal to differential IF signals (IF1 and IF2) at 43.75 MHz and outputs the first and second IF signals to a saw filter 14 where the signal is filtered and limited to a 6 MHz bandwidth. The resultant signal is passed to demodulator 16, where an analog-to-digital (or "A/D") conversion of the signal, followed by a QAM 64/256 demodulation, viterbi decoding and forward error correction of the input signal is performed. The digital signal produced thereby is then transmitted to media access controller (or "MAC") 18 which controls the protocol and administration layer of cable modem 10.

MAC 18, which may be implemented in either hardware or a combination of hardware and software, assigns frequencies and data rates for upstream transmission and allocates time slots for upstream transmission. From MAC 18, data continues on to interface 19 for a computer system (not shown). For example, interface 19 may be a peripheral connection interface (or "PCI") bus of the computer system. Preferably, the PCI bus should include a slot in which cable modem tuner 10, implemented on a card, is inserted. Unlike most cards, however, cable modem 10 should be enclosed in a shielded unit to prevent the computer system from interfering with proper operation of tuner 12.

In addition to being part of the downstream path from the CATV signal source to the computer system, MAC 18 is also in the upstream path which originates at the computer system and extends to the network. Digital data originating a the computer system, for example, at the processor of memory subsystems thereof, is placed on the PCI bus or other interface 19 for transfer to MAC 18. From MAC 18, the digital data is passed on to the modulator 20. There, the digital data is modulated onto a selected frequency and converted into an analog signal. From modulator 20, the signal is transmitted to tuner 12 where it enters at a first input port of a front end duplex filter stage 32 which, as will be more fully described below, directs the analog signal out an input/output (or "I/O") port and onto the cable 11 for transmission to a specified device residing on the network.

Finally, cable modem 10 also includes processor subsystem 22, for example, a microcontroller, and memory subsystem 24. Processor subsystem 22 is coupled to tuner 12 by an IIC bus 26 while memory subsystem 24 is coupled to processor subsystem 22 by local bus 28. Via IIC bus 26, processor subsystem 22 controls band selection and tuning for tuner 12, for example, using information residing in memory subsystem 24.

Referring next to FIG. 4, tuner 12 will now be described in greater detail. As will be more fully described below, tuner 12 is comprised of a front end comprised of front end duplex filter stage 32 and front end decoupler stage 34 and back end comprised of single conversion tuner stage 36. Front end duplex filter stage 32 has first input/output (or "I/O"), line coupled to cable 11 by an I/O port 13, a second, input, line coupled to upstream modulator 20 of cable modem 10 by input port 15 and a third, output, line coupled to front end decoupler stage 34 of tuner 12. The front end duplex filter stage 32 enables tuner 12 to handle bi-directional transmissions. Specifically, front end duplex filter stage 32 is configured such that an incoming CATV signal originating on the network will propagate along the downstream path to the output line of front end duplex filter stage 32. CATV signal will, however, blocked from propagating along the upstream path along the second input line. Conversely, a signal will, however, be blocked from propagating along the upstream path along the second input line. Conversely, a signal originating at the computer will propagate along the upstream path and onto cable 11 while being blocked from traveling along the downstream path to the output line of front end duplex filter stage 32.

Front end decoupler stage 34 has an input line coupled to the output line of front end duplex filter stage 32 and the output line coupled to single conversion tuner stage 36. In turn, single conversion tuner stage 36 has an input line coupled to the output line of front end decoupler stage 34 and first and second output lines IF1 and IF2 coupled to saw filter 14 of cable modem 10. From multiple CATV signals, each at a discrete frequency within the 54 to 858 MHz frequency band, entering the single conversion tuner, the CATV signal operating at a selected frequency is converted into an IF signal and passed to saw filter 14 (FIG. 3) while the CATV signals at the remaining frequencies are rejected.

Front end decoupler stage 34 decouples the front end of tuner 12, i.e., front end duplex filter stage 32 and front end decoupler stage 34, from back end of the tuner 12 i.e., single conversion tuner stage 36, coupled to the output line of front end decoupler stage 34. As a result, an incoming CATV signal comprised of a plurality of RF signals passes through front end decoupler stage 34 and enters single conversion tuner stage 36 where a selected RF signal is converted into the IF signal while the remaining ones of the plurality of RF signals are rejected but the ones of the plurality of RF signals, as well as return signals produced by single conversion tuner stage 36, are blocked from passing back through front end decoupler stage 34. Without front end decoupler stage 34, both the rejected ones of the plurality of RF signals and the return signals produced by the single conversion tuner stage 36 would pass through front end duplex filter stage 32 and back onto cable 11 where, since cable 11 is typically coupled to multiple tuners, the return signal would create interference with the CATV signal being received by other tuners.

The configuration of each of front end duplex filter stage 32, front end decoupler stage 34 and single conversion tuner stage 36 will now be described in greater detail. As previously mentioned, front end duplex filter stage 32 has an I/O port coupled to cable 11, an input port 15 coupled to the upstream modulator 20 of cable modem 10 and an output coupled to an input of front end decoupler stage 34. Front end duplex filter stage 32 further includes node 17 coupled to I/O port 13, low bandpass filer 52 positioned between node 17 and input port 13 and a high bandpass filter 54 positioned between node 17 and the output line. Cable modem 10 is bi-directional in that the front end duplex filter stage 32 of tuner 12 enables both the transmission of signals from a signal source on the network to the PC and from the PC to the network. Specifically, the frequency band for the input signal received from a signal source on the network is the CATV frequency band—54 MHz to 858 MHz. Low bandpass filer 52 is selected such that only signals below the CATV frequency band can pass. For example, low bandpass filter 52 may have a pass band having a lower limit at 5 MHz and an upper limit at 42 MHz. As a result, low bandpass filter 52 blocks the input signal to cable modem 10 which originates at a signal source on the network from propagating to upstream modulation circuit 20. High bandpass filter 54, on the other hand, is selected to have a pass band having lower and upper limits which correspondence to the lower and upper limits of the CATV frequency band. Accordingly, high bandpass filter 54 passes the input signal to cable modem 10 which originates on the network to front end decoupler stage 34. Conversely, the frequency band for the input signal to cable modem 10 which originates at the computer extends from 5 MHz to 42 MHz. As a result, low bandpass filter 52 passes the input signal to I/O port 13 while high bandpass filer 54 blocks the input signal from propagating to front end decoupler stage 34.

Front end decoupler stage 34 is comprised of an automatic gain control (or "AGC") circuit 56 having an input coupled to the output of front end duplex filter state 32 and an output coupled to an input of broadband amplifier 58. In turn, the output of broadband amplifier 58 is input single conversion tuner stage 36. The input signal to tuner 12 which is passed by high bandpass filter 54 is fed to AGC circuit 56 where, in response to an AGC level signal generated by demodulator circuit 16, the input signal is sufficiently attenuated to avoid an overload within single conversion tuner stage 36 when the input signal is later passed thereto.

In order for broadband amplifier 58 to carry the input signal to single conversion tuner stage 36, broadband amplifier 58 must have a source impedance matching that of cable 11. Otherwise, the input signal would be rejected by the broad band amplifier 58. Accordingly, broadband amplifier 58 is a low gain, high power amplifier which matches the source impedance of cable 11, typically 75 ohms, and which includes pass bands centered at the frequency of each of the 110 channels within the 54 MHz to 858 MHz CATV frequency band for which a signal is carried. Thus, unlike conventional single conversion tuners, all channels within the frequency band are passed to single conversion tuner stage 36. Broadband amplifiers such as broadband amplifier 54 are unidirectional. Accordingly, broadband amplifier 58 decouples single conversion tuner stage 36 from the front end of tuner 12 such that the channels passed to single conversion tuner stage 36 but later rejected thereby, as well as any return signals generated by single conversion tuner stage 36 itself, are rejected by broad band amplifier 58, thereby preventing these signals from passing back through front end decoupler stage 38 and into the front end of tuner 12.

Single conversion tuner stage 36 is comprised of first, second and third tuner circuits, each for a different frequency range. The first (or UHF) tuner circuit selects channels within the 469 MHz to 858 MHz frequency range and is comprised of a first adjustable bandpass filter 60-1, AGC amplifier circuit 62-1, second adjustable bandpass filter 64-1, mixer 66-1 and local oscillator (or "LO") 68-1. The second (or VHF high) tuner circuit selects channels within the 163 MHz to 468 MHz frequency range and is comprised of a first adjustable bandpass filter 60-2, AGC amplifier circuit 62-2, second adjustable bandpass filter 64-2, mixer 68-2 and local oscillator 68-2. Finally, the third (or VHF low) tuner circuit selects channels within the 54 MHz to 162 MHz frequency range and is comprised of first adjustable filter 60-3, AGC amplifier circuit 62-3, second adjustable bandpass filter 64-3, mixer 66-3 and local oscillator 68-3.

Apart from the frequency of the channel selected thereby, each of the first, second and third tuner circuits operate identically. Accordingly, only one of the three tuner circuits need be described in greater detail. Thus, by way of example, the operation of the first tuner circuit shall now be described. As previously set forth, the input signal entering the single conversion tuner stage 36 includes all of the 110 channels contained within the CATV frequency range. Processor subsystem 22 selects a channel to be selected by adjustable bandpass filer 60-1, typically of the varactor tuning type, for conversion to an IF signal and issues an appropriate instruction to phase locked loop (or "PLL") circuit 72 to lock to the frequency of the selected channel. In response, PLL circuit 72 adjusts the bandpass for adjustable bandpass filer 60-1 such that the selected channel passes to AGC amplifier circuit 62-1 where the signal for the selected channel is amplified with sufficient gain to eliminate any contribution of noise from successive stages of the single conversion tuner. The signal is then passed on to second adjustable bandpass filter 64-1, again, typically of the varactor tuning type, for a second filtering of the, now amplified, signal, again at the frequency of the selected channel.

From second adjustable bandpass filter 64-1, the selected signal propagates to mixer circuit 66-1 for conversion from an RF signal to an IF signal. Specifically, under control of PLL circuit 72, local oscillator 68-1 generates a signal having a frequency of the received signal plus the IF of 43.75 MHz. When transmitted to mixer 66-1 together with the received signal, the frequency of the selected signal, the IF signal of 43.75 MHz, is generated. The IF signal is then passed by mixer 66-1 to IF stage 70 where a differential amplifier converts the IF signal to a differential IF signal which is passed to saw filter 14 and along the downstream path through the cable modem 10 in the manner previously described.

The strength of the signal generated by local oscillator 68-1 is often of great concern as a possible source of a return signal which, when added to the selected signal, would pass back through second adjustable bandpass filters 64-1, AGC amplifier circuit 62-1 and first adjustable bandpass filter 60-1 of single conversion tuner stage 36 and the front end of tuner 12 and onto the network where it could potentially interfere with the CATV signal being received by other tuners residing on the network. However, broadband filter 58 sufficiently decouples any return signal generated by local oscillator 68-1 which passes back through single conversion tuner stage 36 to comply with the <−55 dBmV limitation on return signal specified by MCNS standards. Further, the isolation of the return path input and the IF output is at least 85 dB to ensure no cross-interference from the presence of an upstream signal. Finally, the pass band flatness within a 6 MHz band is, at most, 2.5 dB.

Figure 5:
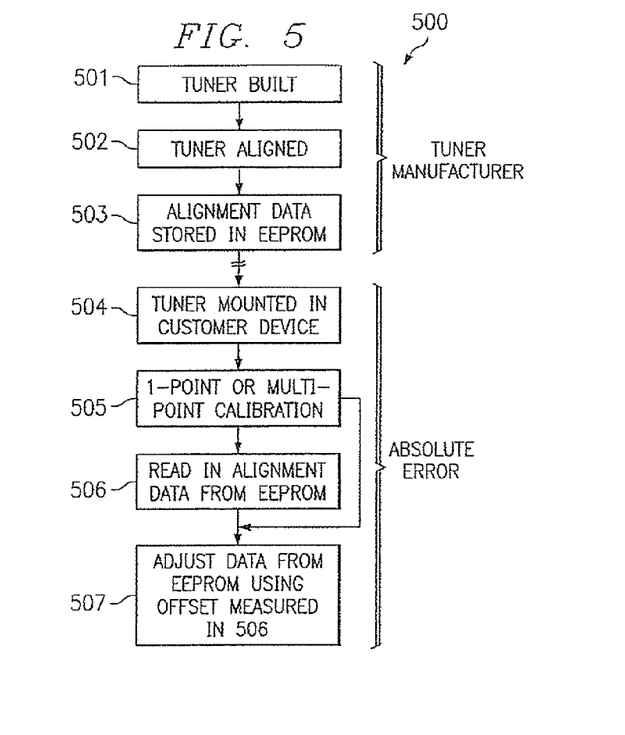
FIG. 5 shows a flow chart of the steps of the method of one embodiment of the invention.

Turning now to FIG. 5, there is shown system 500 where the tuner is built at Step 501. Following production of the tuner, the gain variation must be accounted for in the alignment process. This is done at Step 502. In Step 502 the tuner is automatically calibrated, taking into account measured gain variation over frequency and AGC voltage. This gain data is then stored in a tabular format within the EEPROM (or within some other non-volatile memory device) at Step 503 located in the tuner. Typical calibration equipment would include an RF signal source and a power or spectrum measuring device which would accurately detect the output power from the unit, thereby allowing a comparison of input versus output power, which would treble the absolute gain of the tuner.

One data format for storage is shown below.

| Byte Address [hex] | Byte Value | Symbol | Remark |
|---|---|---|---|
| | Fixed Production Data | | |
| 00 | t.b.d. | | |
| 01 | t.b.d. | | |
| ... | | | |
| 0F | Data Check Sum | | calculation t.b.d. |
| | Fixed Tuner Data | | |
| 10 | Lowest Frequency   VHF-L | FVHF | 2 bytes |
| 11 | Takeover Frequency  VHF-L to VHF-H | TOF1 | 2 bytes |
| 12 | Takeover Frequency  VHF-H to UHF | TOF2 | 2 bytes |
| 13 | Highest Frequency   UHF | FUHF | 2 bytes |
| 14 | Nominal Gain Value | GNOM | 1 byte |
| 15 | Number of Frequencies for RF Gain | N | 1 byte |
| 16 | Number of Frequencies for RF AGC | L | 1 byte |
| 17 | Number of Voltages for RF AGC | K | 1 byte |
| 18 | Number of Voltages for AGC | M | 1 byte |
| 19 | Reserved | | |
| ... | | | |
| | Dynamic Data | | |
| 19 + 1 | Frequency 1 for RF Gain | FG1 | |
| 19 + i | Frequency i for RF Gain | FGi | |
| ... | | | |
| 19 + N | Frequency N for RF Gain | FGN | |
| 19 + N + 1 | RF Gain at Frequency 1 | G1 | |
| ... | | | |
| 19 + N + N | RF Gain at Frequency N | GN | |
| 19 + 2 * N + 1 | Frequency for RF AGC 1 | FA1 | |
| ... | | | |
| 19 + 2 * N + L | Frequency for RF AGC L | FAL | |
| 19 + 2 * N + L + 1 | Voltage for RF AGC 1 | VA1 | |
| ... | | | |
| 19 + 2 * N + L + K | Voltage. for RF AGC K | VAK | |
| (c1) + 1 | RF Gain Reduction at FA1 and VA 1 | A11 | (c1) = (19 + 2 * N + L + K) |
| ... | | | |
| (c1) + K | RF Gain Reduction at FA1 and VAK | A1K | |

-continued

| Byte Address [hex] | Byte Value | Symbol | Remark |
|---|---|---|---|
| (c1) + K + 1 | RF Gain Reduction at FA2 and VA1 | A21 | |
| ... | | | |
| (c1) + (L − 1) * K + K | RF Gain Reduction at FAL and VAK | ALK | |
| (c2) + 1 | Voltage for IF AGC 1 | VIF1 | (c2) = (c1) + (L − 1) * K + K |
| ... | | | |
| (c2) + M | Voltage for IF AGC M | VIFM | |
| (c3) + 1 | IF Gain Reduction at VIF1 | B1 | (c3) = (c2) + M |
| ... | | | |
| (c3) + M | IF Gain Reduction at VIF1 | BM | |

The customer, perhaps a company building a modem or other device, would then receive the tuner for mounting. STEP 504, into the customer's device. The tuner then would include the non-volatile memory with the calibration data stored in it. In order to account for any gain variations within the customer's device, which includes components or circuitry external and additional to the tuner, the customer would ideally perform a single or multi-point power calibration, STEP 505, themselves in order to account for any additional gain variation within their entire system. However, since the tuner variation has already been accounted for in the calibration step performed during the tuner manufacture, the chances are that most of the gain variation in the customer's device will not be frequency dependent. Therefore, one or a low number of point calibration could be used.

Following this simple calibration at the customer's site, the data stored in the memory of the tuner is then read, STEP 506. This data could be maintained in the tuner or it can be shifted to the customer's device. In some situations, the customer's data could be stored in the tuner's memory. The customer could adjust the simple calibration done in their own factory by an offset, as a function of frequency using the tuner's stored data. By accounting for these two calibrations, one performed by the tuner manufacturer and a simple one performed at the customer's site, one can then calculate within the required amount of accuracy, the received power coming into the device. Of course the data format which would be stored in the tuner and the calibration that the customer uses at their site could be in many different versions, fashions or configurations, and therefore the calculation done at the end to determine the complete power gain in the tuner could take many forms.

It should be noted also that the information stored in the tuner can be generic for many different end users, or could be tailored to a specific user's requirement to match a specific format, if so required. Thus, a tuner for one application may have one type of information stored therein, and a tuner that is destined to be used for another group of devices could have a different format of data. Also, it is possible that a master tuner data memory can be created and maintained and different users then would use different sections of that data as they deem appropriate.

In addition, the concepts of this invention can be used to control the "take-over-point" (TOP). TOP refers to the input level where one AGC stops (i.e. RE gain control) and another takes over (i.e. IF gain control). Typically, one IF AGC voltage (at one selected frequency) is defined as the TOP. So long as the IF AGC voltage is above this level the RE AGC will be at its maximum (no gain reduction). Using this invention one could, if desired, set different TOP values for different frequencies. Or one could tailor the TOP for each modem based on data stored in the tuner.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cable modem suitable for coupling to a CATV cable, said cable modem comprising:
   a tuner, said tuner comprising a memory storing information, said information stored in said memory prior to fabrication of said modem and relating to gain variation of said tuner over the operating frequency and voltage and comprising take-over-point values for respective frequencies over the operating frequency of said tuner; and
   a processor adapted to provide instructions to said tuner over a communication link and adapted to respond to information requests directed to said modem from said CATV; wherein said response is a function of said stored information.

2. The modem of claim 1 wherein said stored tuner information is exchanged between said modem and said tuner and said processor over said communication link.

3. The modem of claim 1 wherein said information is stored in said tuner on non-volatile memory.

4. The modem of claim 1 wherein said information stored in said tuner is provided to said processor upon request of said modem.

5. The modem of claim 1 wherein said information stored in said tuner is transferred to said processor for storage external to said tuner.

6. The modem of claim 1 wherein said information stored in said tuner is stored therein in sets.

7. The modem of claim 6 wherein said stored tuner information is exchanged between said processor and a particular set of information stored in said tuner over said communication link.

8. The modem of claim 7 wherein said particular set of information is selected based upon an identification of said modem to said tuner.

9. A modem suitable for processing RF signals to and from a remote location, said modem comprising:
- a tuner, said tuner comprising a memory storing information, said information stored in said memory during production of said tuner and prior to said tuner being included with said modem and relating to gain variation of said tuner over the operating frequency and voltage and comprising take-over-point values for respective frequencies over the operating frequency of said tuner; and
- a processor adapted to provide instructions to said tuner over a communication link and adapted to respond to information requests directed to said modem from said remote location; wherein said response is a function of said stored information.

10. The modem of claim 9 wherein said stored tuner information is exchanged between said tuner and said processor over said communication link.

11. The modem of claim 9 wherein said information is stored in said tuner on non-volatile memory.

12. The modem of claim 9 wherein said information stored in said tuner is provided to said processor upon request of said modem.

13. The modem of claim 9 wherein said information stored in said tuner is transferred to said processor for subsequent storage external to said tuner.

14. A method of manufacturing a modem, said method comprising the steps of:
- following manufacturing processes for the assembling of said modem;
- connecting a tuner as an input to said modem; said tuner having stored therein a plurality of different tuner operational parameters as a function of RF frequency and power levels voltage and comprising take-over-point values for respective frequencies over the operating frequency of said tuner, said operational parameters stored on said tuner prior to said connecting;
- said connections including a communication link between said tuner and said modem so as to allow the transfer to said modem of selected ones of said stored parameters from said tuner.

15. The method of claim 14 wherein upon a transfer of a parameter to said modem, said transferred parameter is stored within said modem outside of said tuner.

16. The method of claim 14 further comprising the step of:
- accessing a memory in said tuner within a modem to control the TOP of each channel of said device on a channel by channel basis.

* * * * *

UNITED STATES PATENT AND TRADEMARK OFFICE
CERTIFICATE OF CORRECTION

PATENT NO.       : 8,627,393 B1
APPLICATION NO.  : 12/024740
DATED            : January 7, 2014
INVENTOR(S)      : Barry Koch et al.

It is certified that error appears in the above-identified patent and that said Letters Patent is hereby corrected as shown below:

In the Specification

At column 1, line number 4, delete "COMMUNICATION" and replace with --COMMUNICATIONS--.
At column 1, line number 28, delete "RE" and replace with --RF--.
At column 1, line number 30, delete "RE" and replace with --RF--.
At column 2, line number 7, delete "from end" and replace with --front end--.
At column 4, line number 4, delete "modern" and replace with --modem--.
At column 4, line number 9, delete "modern" and replace with --modem--.
At column 4, line number 11, delete "modern" and replace with --modem--.
At column 6, line number 56, delete "modern" and replace with --modem--.
At column 9, line number 28, delete "modern" and replace with --modem--.
At column 10, "Dynamic Data" Table, line number 14, delete "RF Gain Reduction at FA1 and VA I" and replace with --RF Gain Reduction at FA1 and VA1--.
At column 11, line number 16, delete "mounting." and replace with --mounting,--.
At column 11, line number 60, delete "RE" and replace with --RF--.
At column 11, line number 63, delete "RE" and replace with --RF--.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,627,393 B1 | Page 1 of 1 |
| APPLICATION NO. | : 12/024740 | |
| DATED | : January 7, 2014 | |
| INVENTOR(S) | : Barry Koch et al. | |

It is certified that error appears in the above-identified patent and that said Letters Patent is hereby corrected as shown below:

On the title page, item (54) and in the specification, column 1, line number 4, delete "COMMUNICATION" and replace with --COMMUNICATIONS--.

In the Specification

At column 1, line number 28, delete "RE" and replace with --RF--.
    At column 1, line number 30, delete "RE" and replace with --RF--.
    At column 2, line number 7, delete "from end" and replace with --front end--.
    At column 4, line number 4, delete "modern" and replace with --modem--.
    At column 4, line number 9, delete "modern" and replace with --modem--.
    At column 4, line number 11, delete "modern" and replace with --modem--.
    At column 6, line number 56, delete "modern" and replace with --modem--.
    At column 9, line number 28, delete "modern" and replace with --modem--.
    At column 10, "Dynamic Data" Table, line number 14, delete
"RF Gain Reduction at FA1 and VA I" and replace with
--RF Gain Reduction at FA1 and VA1--.
    At column 11, line number 16, delete "mounting." and replace with --mounting,--.
    At column 11, line number 60, delete "RE" and replace with --RF--.
    At column 11, line number 63, delete "RE" and replace with --RF--.

This certificate supersedes the Certificate of Correction issued September 30, 2014.

<div style="text-align: center;">
Signed and Sealed this<br>
Twenty-first Day of October, 2014
</div>

<div style="text-align: center;">
Michelle K. Lee<br>
<em>Deputy Director of the United States Patent and Trademark Office</em>
</div>